United States Patent

[11] 3,611,035

[72] Inventor Ellwood S. Douglas
 Orinda, Calif.
[21] Appl. No. 44,187
[22] Filed June 8, 1970
[45] Patented Oct. 5, 1971
[73] Assignee The Rucker Company
 Oakland, Calif.

[54] GROUND FAULT PROTECTIVE SYSTEM HAVING GROUNDED NEUTRAL PROTECTION
 11 Claims, 2 Drawing Figs.
[52] U.S. Cl..................................................... 317/18 D,
 317/27
[51] Int. Cl..................................................... H02n 3/16
[50] Field of Search............................................. 317/18, 27,
 28, 33; 307/94

[56] References Cited
UNITED STATES PATENTS
3,525,018 8/1970 Murphy.......................... 317/27 R

*Primary Examiner*—William H. Beha, Jr.
*Assistant Examiner*—Harvey Fendelman
*Attorney*—Flehr, Hohbach, Test, Albritton & Herbert ABSTRACT: Ground fault protective system and method in which a high frequency tickler voltage is induced on the neutral conductor of a distribution system to indicate inadvertent grounding of that conductor and/or to interrupt the flow of current in the distribution system in response to grounding of the neutral conductor.

PATENTED OCT 5 1971 3,611,035

INVENTOR
ELLWOOD S. DOUGLAS
BY Flehr, Hohbach, Vest,
Albritton & Herbert
ATTORNEYS

GROUND FAULT PROTECTIVE SYSTEM HAVING GROUNDED NEUTRAL PROTECTION

BACKGROUND OF THE INVENTION

This invention pertains generally to ground fault detectors and current interrupters and more particularly to a system and method for preventing such devices from being rendered inoperable by inadvertent grounding of the neutral conductor of a power distribution system.

Heretofore, various types of ground fault detectors and current interrupters have been provided for protecting human life and property against electrical shock and damage resulting from contact with or grounding of the conductors in a power distribution system having a neutral conductor grounded at the source. Most of these devices utilize a differential transformer having a magnetic core and primary windings of at least one turn connected in series with the conductors of the distribution system. The differential transformer also includes a secondary winding which is typically connected to means for giving a visual indication of a ground fault and/or interrupting the flow current in the distribution system in response thereto. Under normal conditions, the total current flowing through the line conductors is equal to the current flowing through the neutral conductor, producing a zero net magnetic flux in the differential transformer core and no output from the secondary winding. Upon the occurrence of a ground fault, the current in the line conductors differs from that in the neutral conductor by an amount equal to the magnitude of the fault current. This difference produces a nonzero net magnetic flux in the transformer core and induces a fault signal in the secondary winding. One example of a ground fault protective system of the foregoing type can be found in U.S. Pat. No. 3,213,321, issued Oct. 19, 1965 to Charles F. Dalziel and assigned to the assignee of the present invention.

While devices of the above character operate satisfactorily under most conditions, their operation is seriously impaired by the occurrence of a low impedance ground on the neutral conductor between the differential transformer and the load. Under normal conditions, the current produced by a ground fault returns to the source through the ground, bypassing the portion of the neutral conductor which passes through the differential transformer. Grounding of the neutral conductor on the load side of the differential transformer provides an alternate path to the source for a ground fault current, causing a portion of this current to return to the source through the neutral conductor and the differential transformer. This substantially reduces the sensitivity of the transformer and makes it impossible to predict the level of fault current required to produce tripping, the increase in fault current required being dependent upon the magnitude of the impedance between the neutral conductor and ground. In addition, grounding of the neutral conductor on both sides of the transformer causes the neutral to act effectively as a shorted secondary winding which imposes a heavy load on the remaining conductors. This also reduces the sensitivity of the transformer and makes it difficult to predict the level of fault current which will produce tripping.

Heretofore, several approaches have been proposed for solving the problem of the grounded neutral conductor. In one of these, a test switch is provided for simulating a ground fault current of the magnitude desired to be detected. If the system is otherwise operating properly, the presence of a grounded neutral will prevent the simulated ground fault from being detected when the switch is closed. This approach has obvious disadvantages. For example, it requires repeated testing of the system, and it does not indicate whether the failure to detect the simulated fault current is due to grounding of the neutral conductor.

Another prior approach consists of the connection of an impedance, such as an inductance, in series with the neutral conductor. While this approach does prevent the neutral conductor from forming a shorted secondary it has the serious drawback of providing protection only when load current is flowing and exceeds a predetermined level.

In the approach disclosed in U.S. Pat. No. 3,506,906 issued Apr. 14, 1970 to the assignee of the present invention, a voltage is induced on the neutral conductor, and this voltage causes a current imbalance in the conductors whenever the neutral conductor is grounded. The voltage is induced on the neutral conductor by means of a transformer having a secondary winding connected in series with that conductor and a primary winding which is energized by current taken from the distribution system. In order to assure proper operation of most ground fault detectors, it is necessary for this induced voltage to be present for substantially all of one-half of each cycle of the line current. In order to handle this amount of power the transformer core must have a cross-sectional area on the order of 1 cm.$^2$ if the core is fabricated of metal. If the core is made of the ferrite ceramic, a substantially larger cross-sectional area is required. These large cores are not suitable for use in miniaturized ground fault protectors such as the combination circuit breaker and ground fault interrupter disclosed in copending application Ser. No. 35,993, filed May 11, 1970 and assigned to the assignee of the present invention.

There is, therefore, a need for a new and improved system and method for preventing differential ground fault protectors from being rendered inoperable by grounding of the neutral conductor. Such a system and method must overcome the foregoing and other difficulties encountered with the systems heretofore provided.

SUMMARY AND OBJECTS OF THE INVENTION

It has been found that most ground fault protectors do not actually require that the induced voltage be present continuously throughout an entire half-cycle. In many systems, it has been found to be sufficient that the induced voltage be present for only a single pulse in the half-cycle. Hence, according to the present invention, a voltage having a frequency substantially higher than that of the line current is induced on the neutral conductor. Upon grounding of that conductor, this voltage produces a current in it, causing an imbalance in the currents in the line and neutral conductors. In one presently preferred embodiment, the induced voltage comprises a train of pulses. The use of pulses or other high frequency waveforms permits substantial reductions in the size and cost of the transformer cores.

It is in general an object of the present invention to provide a new and improved system and method for assuring proper operation of a differential ground fault protector when the neutral conductor becomes grounded.

Another object of the invention is to provide a system and method of the above character in which a voltage having a frequency higher than the powerline frequency is induced on the neutral conductor.

Additional objects and features of the invention will be apparent from the following description in which the preferred embodiments are set forth in detail in conjunction with the accompanying drawing.

DESCRIPTION OF THE PREFERRED EMBODIMENTS

The embodiments shown in both of the figures are illustrated in connection with a power distribution system comprising a plurality of conductors carrying alternating current between a source and a load. The distribution system shown is a conventional three-wire, single-phase 120/240-volt alternating current system operating at a line frequency of 60 hertz. The system includes two line conductors $L_1$ and $L_2$ and a neutral conductor N. The neutral conductor is grounded at the source. This distribution system is illustrated by way of example only, and it is to be understood that the invention can be utilized with any single-phase or polyphase AC distribution system having a plurality of conductors, one of which is grounded at the source.

Figure 1:
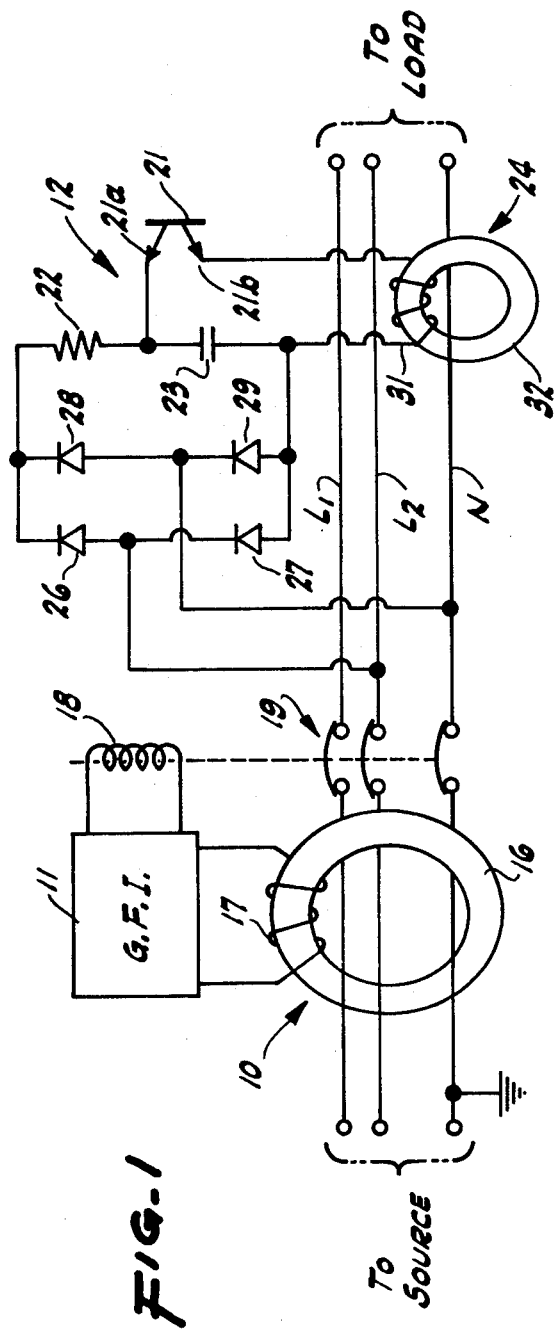
FIG. 1 is a block diagram of one embodiment of a system incorporating the present invention.

The system illustrated in FIG. 1 includes ground fault sensing means 10 connected for monitoring the flow of current in the line and neutral conductors and producing a fault signal when the total current in the line conductors $L_1$, $L_2$ is not equal the current in the neutral conductor N. The output of the sensing means 10 is connected to a ground fault interrupter 11 which includes means for interrupting the flow of current in the conductors in response to an imbalance therein. This embodiment also includes a pulse generator 12 connected for inducing a pulsating voltage on the neutral conductor N.

The ground fault sensing means 10 comprises a differential transformer having a toroidal core 16 through which each of the conductors $L_1$, $L_2$ and N pass to form primary windings of at least one turn. A secondary winding having a plurality of turns is wound on the core 16. This winding serves as an output winding and is connected to the ground fault interrupter 11.

The ground fault interrupter 11 includes means for receiving ground fault signals from the differential transformer secondary windings 17 and conditioning these signals for energizing the trip coil 18 of a circuit breaker having a plurality of contacts 19 connected to the conductors of the distribution circuit. The ground fault interrupter can be of conventional design and examples of suitable interrupters can be found in U.S. Pat. No. 3,213,321, issued Oct. 19, 1965; and copending application Ser. No. 18,158, filed Mar. 10, 1970; and copending application Ser. No. 19,625, filed Mar. 16, 1970; all assigned to the assignee of the present invention. Alternatively, if automatic current interruption is not desired, the ground fault interrupter can be replaced by a ground fault indicator such as is disclosed in copending application Ser. No. 39,056, filed May 20, 1970 and assigned to the assignee of the present invention.

The pulse generator 12 includes a diac 21, a charging resistor 22, a timing capacitor 23, and an output transformer 24. Direct current operating power is supplied to the pulse generator by means of a full wave bridge rectifier consisting of diodes 26–29 connected for receiving input current from the conductors of the distribution circuit. The resistor 22 and capacitor 23 are connected in series between the output terminals of the rectifier bridge. The junction of the resistor and capacitor is connected to the first terminal 21a of the diac. The other side of the capacitor is connected to one end of the primary winding 31 of the output transformer 24. The second terminal 21b of the diac is connected to the other end of the winding 31. This winding is wound upon a toroidal core 32 fabricated of a magnetic material. Because of the low time integral of voltage imposed upon this transformer by the pulse generator, the core 32 can have a cross-sectional area on the order of a few square millimeters. This transformer also includes a single-turn secondary winding formed by the neutral conductor and passing through the opening in the core.

Alternatively, if desired, other types of pulse generators can be used in place of the diac circuit illustrated in FIG. 1. Other suitable circuits can use a silicon controlled rectifier, a four-layer diode, a unilateral or bilateral switch, or a transistor multivibrator. Likewise, other types of power supplies can be used instead of the rectifier bridge shown in FIG. 1. For example, the operating power for the pulse generator can be taken directly from the DC supplies already present in most ground fault protectors, and in some case it can be taken directly from the AC lines.

Operation and use of the system illustrated in FIG. 1 can be described briefly. In the absence of a ground fault, the total current flowing in the line conductors $L_1$, $L_2$ is equal to the current flowing in the neutral conductor N. This produces a zero net magnetic flux in the core 16, and no voltage is induced in the winding 17. Upon the occurrence of a ground fault, the total current in the line conductors is no longer equal to the current in the neutral conductor. This produces a nonzero net magnetic flux in the core 16 and induces a fault signal in the secondary winding 17. The ground fault interrupter 11 responds to this fault signal by energizing the coil 18 and opening the contacts 19 to interrupt the flow of current in the distribution circuit.

The capacitor 23 charges with current from the rectifier bridge through the resistor 22. The voltage on the capacitor rises until it reaches the firing voltage of the diac 21, at which point the diac fires, coupling a voltage across the winding 31 of the output transformer. Current through this winding rises gradually, then falls as the capacitor is discharged. The diac then turns off, and the capacitor 23 again begins to charge through the resistor 22. The process repeats as long as the conductors in the distribution system are energized. Thus, a continuous train of voltage pulses is applied to the winding 31, and these pulses induce voltage pulses in the neutral conductor end which passes through the transformer core 32. The voltage pulses induced on the neutral conductor have no effect upon the current balance in the distribution system as long as the neutral conductor is not grounded on the load side of the transformer 24. When such grounding does occur, the voltage pulses produce a current in the neutral conductor which does not appear in either of the line conductors. This imbalance is detected by the ground fault sensing means 10 and causes the contacts 19 to open, interrupting the flow of current in the distribution system.

Figure 2:
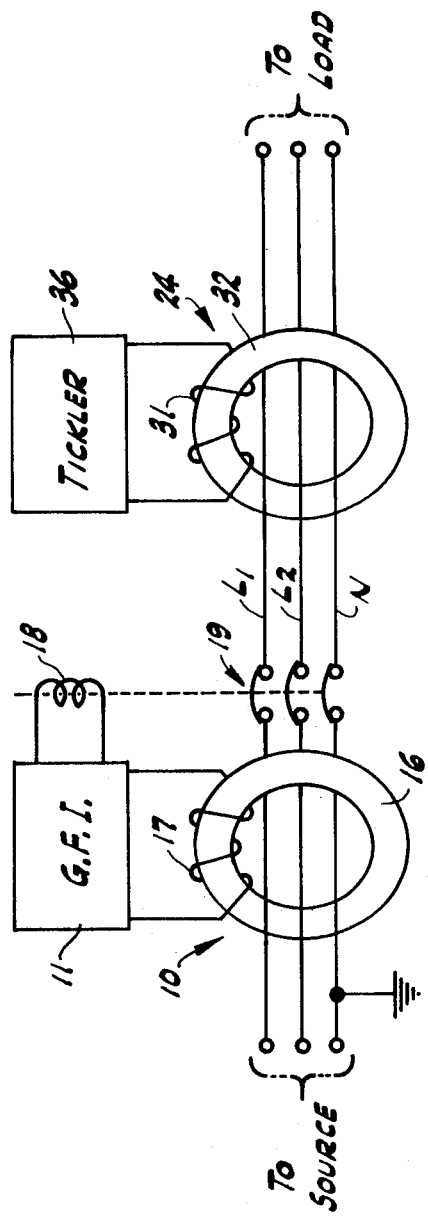
FIG. 2 is a block diagram of another embodiment of a system incorporating the present invention.

The system illustrated in FIG. 2 is generally similar to that shown in FIG. 1. The diac-operated pulse generator has been replaced, however, with tickler means 36 for producing a high-frequency voltage in the transformer winding 31. The tickler means can comprise a pulse generator of the type shown in FIG. 1. It can also comprise a conventional oscillator or signal generator for producing a sine wave or other repetitive waveform at the desired frequency. This system also differs from that shown in FIG. 1 in that all of the conductors in the distribution system now pass through the toroidal core 32 of the output transformer 24.

Operation and use of the system illustrated in FIG. 2 are identical to the operation and use of the system shown in FIG. 1 except that the voltage produced by the tickler means 36 is induced on the line conductors $L_1$, $L_2$ as well as on the neutral conductor N. Thus, should one of the line conductors be shorted to an unprotected energized conductor, the induced voltage will produce an imbalance in the distribution system conductors, and this will cause the contacts 19 to be opened. Such shorting would occur, for example, if one of the line conductors $L_1$, $L_2$ were to contact itself on opposite sides of the ground fault protector.

The frequency or repetition rate of the ticker means 36 and pulse generator 12 is chosen to be compatible with the type of ground fault detector used in the system. For example, in a ground fault interrupter of the type disclosed in U.S. Pat. No. 3,213,321, issued Oct. 19, 1965, the pulse rate or frequency of the induced voltage might be on the order of five times the frequency of the line current. In a pulse-sampling circuit of the type disclosed in copending application Ser. No. 19,625 filed Mar. 16, 1970, the neutral pulses should be synchronized with the sampling time. In a flux storage system, as disclosed in copending application Ser. No. 18,158 filed Mar. 10, 1970, the voltage pulses induced in the neutral conductor should occur slightly before the sampling pulses. Thus, the neutral pulses can have the same frequency as the sampling pulses but be slightly out of phase with them. Alternatively, the neutral pulses can have a frequency substantially higher than that of the sampling pulses so that at least one neutral pulse will fall in every interval between two sampling pulses.

So far, the method of the present invention has been discussed in connection with two preferred embodiments of the system for carrying it out. This method can be summarized as comprising the steps of generating a tickler voltage at a frequency higher than that of the line current and inducing the tickler voltage on the neutral conductor of a distribution system so that upon grounding of the neutral conductor a current flows therein. This current produces an imbalance in the currents in the distribution system conductors. The imbalance is sensed by a ground fault detector which either gives a warning of the condition in the conductors or interrupts the flow of current therein.

It is apparent from the foregoing that a new and improved system and method have been provided for preventing differential ground fault interrupters from being rendered inoperable by grounding of the neutral conductor. While only the presently preferred embodiments have been described herein, as will be apparent to those familiar with the art, certain changes and modifications can be made without departing from the scope of the invention as defined by the following claims.

I claim:

1. In a protective device adapted for connection in a power distribution system having a neutral conductor and at least one line conductor carrying current between a source and a load, said neutral conductor being grounded at said source, ground fault sensing means connected for monitoring the flow of current in the line and neutral conductors and producing a fault signal when the total current in the line conductors is not equal to the current in the neutral conductor, and tickler means coupled to said neutral conductor for producing a high frequency current therein upon grounding of said neutral conductor in addition to the grounding at said source, said high-frequency current serving to produce a current imbalance in the line and neutral conductors, causing said ground fault sensing means to produce a fault signal.

2. A protective device as in claim 1 together with means connected for interrupting the flow of current in said line and neutral conductors in response to said fault signal.

3. A protective device as in claim 1 wherein said tickler means includes pulse generator means coupled to said neutral conductor through a transformer.

4. A protective device as in claim 3 wherein said pulse generator means includes a semiconductor switching element.

5. A protective device as in claim 3 wherein said transformer includes a toroidal core of magnetic material, a primary winding having at least one turn wound on said core and connected to the output of said pulse generator means, and a secondary winding of at least one turn connected in series with said neutral conductor.

6. A protective device as in claim 1 wherein said tickler means is also coupled for producing a high-frequency current in one of the line conductors upon shorting of the line conductor to an unprotected conductor.

7. A protective device as in claim 6 wherein said tickler means includes a transformer having a plurality of secondary windings of at least one turn connected in series with the line and neutral conductors.

8. In a ground fault protective device of the type having ground fault sensing means for monitoring the flow of current in line and neutral conductors interconnecting a source and a load, the neutral conductor being connected to ground at the source, a pulse generator adapted for producing voltage pulses at a rate greater than the frequency of the current from said source, and a transformer having a primary winding connected for receiving the output of said pulse generator and a secondary winding of at least one turn connected in series with said neutral conductor for inducting said voltage pulses on said neutral conductor, said voltage pulses producing a current in said neutral conductor upon grounding of the same, thereby causing imbalance in the currents in said line and neutral conductors.

9. A ground fault protective device as in claim 8 wherein said pulse generator includes a diac and a timing capacitor connected for controlling the firing of said diac.

10. In a method for preventing a differential ground fault protective device from being rendered inoperable by grounding at the load of the neutral conductor of a power distribution system in which the neutral conductor is normally grounded at its source end, the steps of generating a tickler voltage at a frequency higher than that of the current in the distribution system and inducing the tickler voltage on the neutral conductor so that upon grounding of said conductor a current flows therein, producing an imbalance in the currents in the distribution system conductors and causing actuation of the ground fault protective device.

11. A method as in claim 10 together with the additional step of inducing the tickler voltage on the other conductors in the distribution system to prevent the protective device from being rendered inoperable by the shorting of one of these other conductors to an unprotected conductor.